(12) United States Patent
Bystricky et al.

(10) Patent No.: US 7,407,901 B2
(45) Date of Patent: Aug. 5, 2008

(54) IMPACT RESISTANT, THIN PLY COMPOSITE STRUCTURES AND METHOD OF MANUFACTURING SAME

(75) Inventors: Pavel Bystricky, Lexington, MA (US); Jerome P. Fanucci, Lexington, MA (US)

(73) Assignee: Kazak Composites, Incorporated, Woburn, MA (US)

( * ) Notice: Subject to any disclaimer, the term of this patent is extended or adjusted under 35 U.S.C. 154(b) by 112 days.

(21) Appl. No.: 11/331,437

(22) Filed: Jan. 12, 2006

(65) Prior Publication Data

US 2007/0066171 A1    Mar. 22, 2007

Related U.S. Application Data

(60) Provisional application No. 60/645,797, filed on Jan. 21, 2005, provisional application No. 60/643,243, filed on Jan. 12, 2005.

(51) Int. Cl.
*D03D 15/00* (2006.01)
*B32B 5/26* (2006.01)
*B32B 7/12* (2006.01)
*B32B 17/12* (2006.01)
*B32B 18/00* (2006.01)

(52) U.S. Cl. .................. 442/186; 442/265; 442/224; 442/242; 428/293.1; 428/299.1

(58) Field of Classification Search ................ 442/185, 442/186, 206, 207, 224, 265, 242; 428/293.4, 428/299.1, 408, 411.1, 902
See application file for complete search history.

(56) References Cited

U.S. PATENT DOCUMENTS

| | | | | |
|---|---|---|---|---|
| 5,418,063 | A | * | 5/1995 | Booth .................. 428/408 |
| 5,455,107 | A | * | 10/1995 | Homma et al. ........... 442/60 |
| 6,032,342 | A | | 3/2000 | Kawabe et al. ........... 28/283 |
| 6,228,473 | B1 | * | 5/2001 | Takemura et al. ..... 428/295.1 |

* cited by examiner

*Primary Examiner*—Lynda Salvatore
(74) *Attorney, Agent, or Firm*—Weingarten, Schurgin, Gagnebin & Lebovici LLP

(57) ABSTRACT

A reinforced carbon-carbon (RCC) composite material has improved impact resistance. The RCC composite material is formed from a fiber reinforcement of layers or plies of thin ply carbon fiber fabric impregnated with a carbon matrix. Carbon nanotube reinforcement in the matrix further improves impact resistance. The stacking arrangement of the plies of the thin ply fabric also further improves impact resistance.

17 Claims, 3 Drawing Sheets

IMPACT RESISTANT, THIN PLY COMPOSITE STRUCTURES AND METHOD OF MANUFACTURING SAME

CROSS REFERENCE TO RELATED APPLICATIONS

This application claims the benefit under 35 U.S.C. § 119 (e) of U.S. Provisional Application No. 60/643,243, filed on Jan. 12, 2005, and U.S. Provisional Application No. 60/645, 797, filed on Jan. 21, 2005, the disclosures of which are incorporated by reference herein.

STATEMENT REGARDING FEDERALLY SPONSORED RESEARCH OR DEVELOPMENT

This invention was made under Air Force SBIR Contract # FA8650-05-M-5030. The government may have certain rights in this invention.

BACKGROUND OF THE INVENTION

Carbon-carbon (C/C) composite materials offer excellent combinations of specific thermal conductivity and specific stiffness. Also, C/C offers low density, high stiffness, low coefficient of thermal expansion, zero outgassing in the space environment, and a unique high temperature capability. C/C composites graphitized to temperatures greater than 2200° C. provide high through-the-thickness ($k_z$) conduction of 25 to 100 W/m-K (compared to $k_z$=1-5 W/m-K in graphite/cyanate-ester composites), through appropriate choice of the starting matrix and potential fillers.

High performance aerospace vehicles and structures must be made with materials having high specific strength and specific stiffness. Carbon fiber composite materials are used in many lightweight structural applications. The performance and range of applications of these materials are limited, however, by their relatively high susceptibility to impact damage. For example, the space shuttle Columbia accident is believed to have been caused by impact damage to the reinforced carbon-carbon (RCC) leading edge thermal protection system.

The brittle nature of the RCC may be due to the conventional 2D or 2.5D carbon fiber ply architecture. The RCC material used in the space shuttle is fabricated from a precursor 2D woven carbon fiber (rayon based) fabric stacked in 0° and 90° oriented layers. The laminate is 19 layers thick, with the outer two or three layers infused with silica to produce a silicon carbide layer upon subsequent high temperature processing. The SiC outer layer prevents oxidation to allow the RCC structure to survive the high re-entry temperatures encountered by the space shuttle. A micrograph of a cross-section of this RCC material shows significant residual porosity throughout and microcracks in the SiC surface layer. The carbon fiber reinforcement layers exhibit a waviness due to the high crimp angle at fiber crossing points that is inherent in regular thickness woven carbon fiber plies.

Spreading of carbon fiber tows to make thin plies has been achieved by automated tow spreading technology. See U.S. Pat. No. 6,032,342. Thin plies of consistent quality have recently become commercially available, for example, from Itochu in Japan. Plies are available down to a thickness of 1.5 mils, which is five times thinner than the typical 7.5 mil thick standard plies. The plies are available as a unidirectional fabric or a woven fabric formed of ribbon tapes, in various widths, and in long continuous lengths. Composite materials manufactured from thin ply carbon fiber preforms exhibit surprising improvements in mechanical properties over conventional ply composites of identical overall thickness. Tensile strength is increased 30%. Fatigue life is increased more than an order of magnitude. Stiffness and reduction in delamination damage are increased.

Using carbon nanotubes (CNTS) alone as reinforcement to enhance the mechanical properties of a material is challenging. In particular, dispersing CNTs to obtain uniform distributions in a composite is difficult. Furthermore, the high volume fraction loadings (on the order of 60 vol %) required significantly increases the viscosity of the fresh resin/CNT mixture. The use of CNTs is also costly, particularly at such large volumes.

SUMMARY OF THE INVENTION

The present invention provides a carbon-carbon composite material using preforms based on woven carbon fiber thin plies augmented by carbon nanotube toughening. The present composite material has a more microscopically uniform reinforcement architecture and results in a structure having greater impact resistance than conventional ply technology.

The present thin ply composite material allows the manufacture of thinner-walled components with impact and other mechanical properties equivalent to thicker parts made by conventional technology, resulting in more lightweight structures.

DESCRIPTION OF THE DRAWINGS

The invention will be more fully understood from the following detailed description taken in conjunction with the accompanying drawings in which.

DETAILED DESCRIPTION OF THE INVENTION

In the present invention, a reinforced carbon-carbon (RCC) composite material is provided having improved impact resistance. The composite material is formed from a fiber reinforcement of layers or plies of thin ply carbon fiber fabric impregnated with a carbon matrix and preferably further reinforced with carbon nanotubes. The fabrication of the RCC composite begins with a preform 12 of dry or preimpregnated thin ply carbon fiber fabric layers. See FIG. 1. The preform is infiltrated with a carbon precursor matrix material and cured to form a precursor composite material. Various processes, such as vacuum assisted resin transfer matrix molding (VARTM), hot press molding, and pultrusion, can be used to form and cure the precursor composite material. Thereafter, the precursor composite material undergoes a carbonization process to convert the precursor matrix material to carbon through thermal degradation and a densification process to achieve a desired bulk density.

Figure 1:
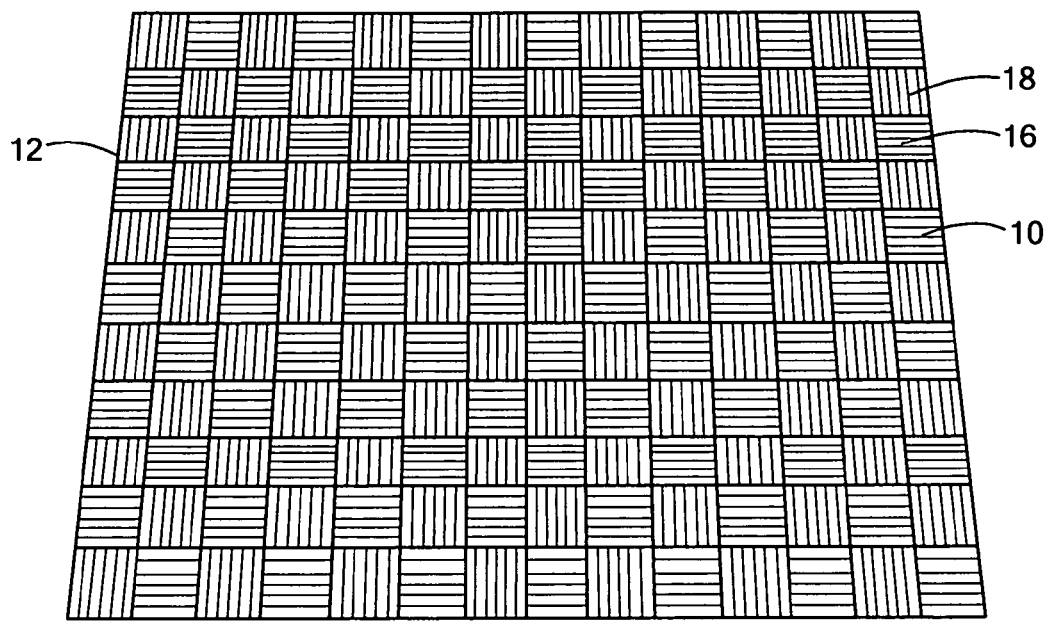
FIG. 1 is an illustration of a thin ply carbon fiber fabric lay-up according to the present invention.
Figure 2A:
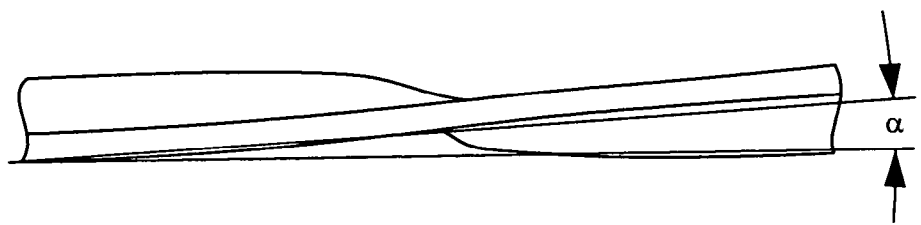
FIG. 2A is a schematic illustration of a smaller crimp angle in a woven fabric.
Figure 2B:
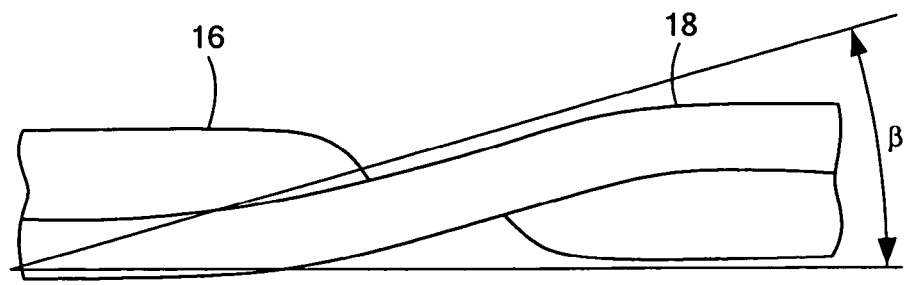
FIG. 2B is a schematic illustration of a larger crimp angle in a woven fabric.

The thin ply carbon fiber fabric has a thickness of 0.006 inch or less if woven and of 0.0025 inch or less if a unidirectional tape. A woven fabric having a thickness of as little as 0.003 inch and a unidirectional tape having a thickness of as little as 0.0015 inch are presently commercially available. Plies can be available individually, for example, on rolls, or pre-stacked. Referring to FIG. 1, a thin ply carbon fiber fabric 10 is formed as a plain weave of ribbons or tapes 16, 18. The width of the ribbons is preferably at least approximately 15 mm (~0.6 inch), which is greater than the ribbon width (0.1 inch) of conventional woven fabric. The crimp angle, or angle at which warp and weft fibers cross, in thin ply fabrics is preferably less than 9° and more preferably less than 5°. Crimp angles a as small as approximately 2° have been achieved. See FIG. 2A. In conventional thick ply (10 mil or 0.01 inch) woven fabrics, the crimp angle $\beta$ ranges from at least 9° (for the finest 1K fabric (having 1000 fibers/tow)) to approximately 14° for regular 12K fabric. See FIG. 2B. In one exemplary embodiment, the ribbons have a width of 20 mm, the crimp angle is approximately 2°, and the areal density of the fabric is approximately 80 g/m$^2$.

The lower crimp angle of thin ply fabric combined with the increased ribbon width results in a more uniform fiber packing and a reinforcement distribution that minimizes matrix rich regions. A smaller crimp angle decreases the maximum internal stress seen by fibers at equivalent load. Qualitatively, it is believed that the thin plies provide a more uniform and isotropic distribution of the reinforcing phase on the microscopic scale that results in fewer discontinuities in the overall microstructure and thus lower internal stresses during deformation. This in turn leads to more homogeneous deformation behavior, less internal damage, and ultimately higher strength.

The stacking arrangement of the thin plies during lay-up according to the present invention improves impact performance as well. The stacking arrangement provides a more microscopically uniform carbon fiber reinforcement architecture, resulting in lower matrix void content. In the preferred embodiment, the plies of the thin ply carbon fiber fabric are laid up in an alternating stacking arrangement incorporating 0° and 90° (straight grain) and ±45° (bias) orientations of the fabric. Preferably, the plies are arranged in a 0°/90° orientation alternating with plies arranged at a 45° orientation. Every other ply of each orientation is flipped over, and the pattern is symmetrical about a mid-plane. An exemplary arrangement of plies is as follows:

| Ply | Orientation |
|---|---|
| 1 | 0° |
| 2 | +45° |
| 3 | 90° |
| 4 | −45° |
| 5 | 0° |
| 6 | +45° |
| 7 | 90° |
| 8 | −45° |
| 9 | −45° |
| 10 | 90° |
| 11 | +45° |
| 12 | 0° |
| 13 | −45° |
| 14 | 90° |
| 15 | +45° |
| 16 | 0° |

It will be appreciated that any desired number of plies can be used, depending on the application.

Epoxy, phenolic resin, and mesophase pitch are all suitable precursor matrix materials for conversion to carbon-carbon composites. Epoxy has the lowest char yield of the three materials, so it is the least preferred, although it may be suitable for some applications for other reasons. Phenolic resin is a particularly suitable thermosetting resin for a starting matrix for conversion into C/C. This is because there are phenolic resins that, following carbonization (~800 to 1200° C.) in an inert environment, have char yields (~45%) high enough to maintain composite integrity and have a molecular structure conducive to some degree to graphitic orientation.

For superior matrix thermal conductivity, mesophase pitch can be used as a precursor for carbon conversion. This matrix material has a higher char yield during carbonization and a great degree of graphitic orientation during heat treatment. Once molded, however, mesophase demonstrates a thermoplastic behavior requiring conversion to a thermoset state prior to high temperature C/C processing, which is performed by an oxidation stabilization process.

Phenolic lay-ups generally have a greater starting density, but lose more material during the carbonization phase, thus requiring more subsequent densification cycles. Mesophase pitch does not perform as well as phenolic during the initial lay-up, rendering the plies more difficult to handle. The resulting precursor composite material has a lower density, but less material is lost during the carbonization phase, requiring fewer subsequent densification cycles.

Thus, both materials, either individually or mixed together, can be used. A suitable phenolic resin is Durite SC-1008 phenolic resin, available from Borden Chemical. It is a heat-reactive, resole type phenolic resin typically used to make glass cloth laminates. A suitable mesophase is AR Synthesized Mesophase Pitch, available from Mitsubishi Gas Chemical Company. It is synthesized from naphthalene, yielding more consistent quality than other similar products that are made from petroleum residue or coal tar. AR has a low softening point (275° C./527° F.) and a low viscosity in the molten state (~10 poise at 350° C./662° F.).

A suitable amount of carbon precursor matrix material is used to provide a matrix comprising approximately 40% of the total final volume of composite material, as would be known by those of skill in the art.

As mentioned above, in the preferred embodiment, carbon nanotubes (CNTs) are incorporated in the carbon precursor matrix material to impart increased strength and toughness to the finished composite material. Addition of CNTs to the matrix also increases the thermal properties of the resulting composite. The CNTs reflect the in-plane properties of graphite, the thermal conductivity of which (3000 W/m-K) is one of the highest known, and have an estimated elastic modulus in excess of 1 Tpa (1000 Gpa).

CNTs are graphitic layers wrapped seamlessly into a tube a few nanometers in diameter and up to a millimeter or more in length. CNTs can be synthesized with single or multiple walls by various processes, such as carbon arc synthesis, chemical vapor deposition, high pressure CO conversion, and pulsed laser vaporization. Suitable carbon nanotubes are readily commercially available from various suppliers.

CNTs can be dispersed in the precursor matrix material by high shear mechanical mixing or using surfactants such as sodium dodecyl sulfate or both. In one exemplary embodiment, CNTs were used that had a diameter of 140±30 nm and a length of 7±2 microns, with a purity greater than 90% and a density of ~1.7 g/cm$^3$. Mechanically mixing the CNTs into phenolic resin having a density of 1.1 g/cm$^3$ at a mass ratio of 2.7% nanotubes to phenolic resulted in a mixture with a viscosity suitable for use in the staging process. A volume fraction of approximately 1.7% CNTs resulted.

Additionally, the incorporation of CNTs in the carbon precursor phenolic resin improved the processability of the composite material. The CNTs lessened distortion of the fabric during handling (staging) and made the fabric drier and less sticky.

CNTs are believed to improve the toughness of the composite material by a "whiskerizing" effect, i.e., the attachment of nanoscale whiskers to the continuous carbon fiber reinforcement. Whiskerized fiber composites yield improvements in transverse shear strength and interlaminar shear properties.

As noted above, various processes such as vacuum assisted resin transfer matrix molding (VARTM), hot press molding, and pultrusion can be used to form the precursor composite material. If a VARTM method is used, vacuum bagging materials are prepared by cutting pieces of peel ply, bleeder, and vacuum bag material slightly larger than the desired finished product size. A VARTM mold is formed with an inlet that leads the resin to wet the full face of the preform prior to penetrating the preform. The resin path then leads through the thickness of the preform and out through the opposite edges to further distribute and trap CNTs within the preform. The preform faces can be lined with perforated PTFE sheets to facilitate preform preparation and de-molding. The preform is inserted in the vacuum bag and placed in the oven. The vacuum pump is attached to the valve and turned on. The carbon precursor resin is impregnated into the preform under vacuum and cured according to any desired temperature and pressure profile, as would be understood by those of skill in the art.

Figure 3:
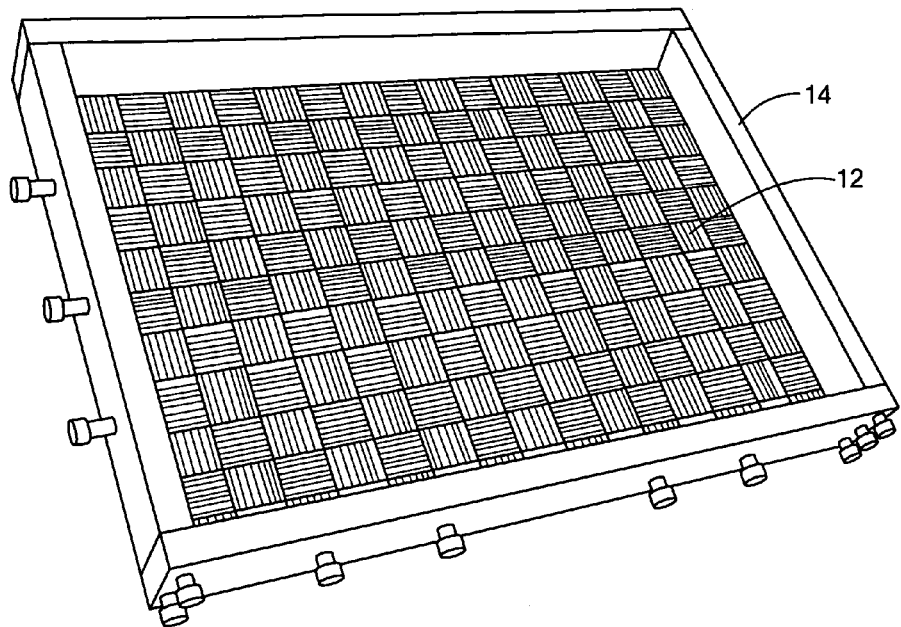
FIG. 3 is an illustration of a thin ply carbon fiber fabric lay-up in a mold.

In a hot press molding process, the preform 12 is laid up in or on a mold 14 having the desired geometry. See FIG. 3. For example, the mold can be rectangular or cylindrical. A press plate, typically aluminum covered with PTFE or another suitable release agent, is secured and pressed down over the part. A small amount of the resin is preferably applied to the PTFE on the press plate and spread out to create a thin layer at least the size of the finished product. The part is then placed in a hot press that is operated at a desired temperature and pressure profile to cure the part.

Figure 4:
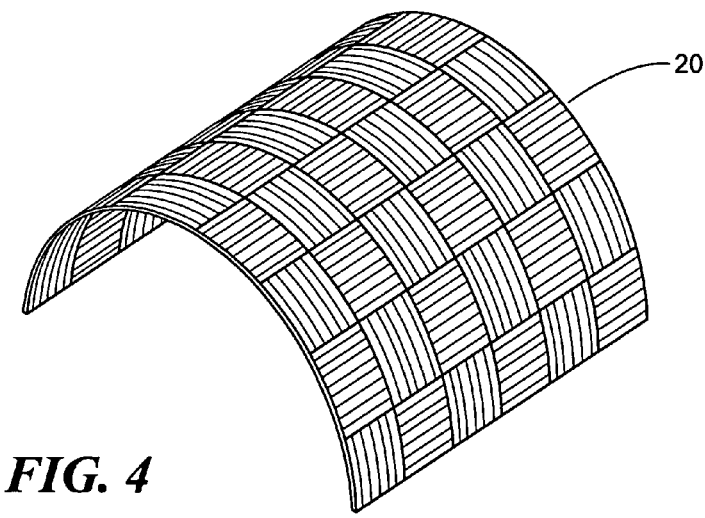
FIG. 4 is an illustration of a thin ply carbon fiber fabric precursor composite material in a half cylinder configuration.
Figure 5:
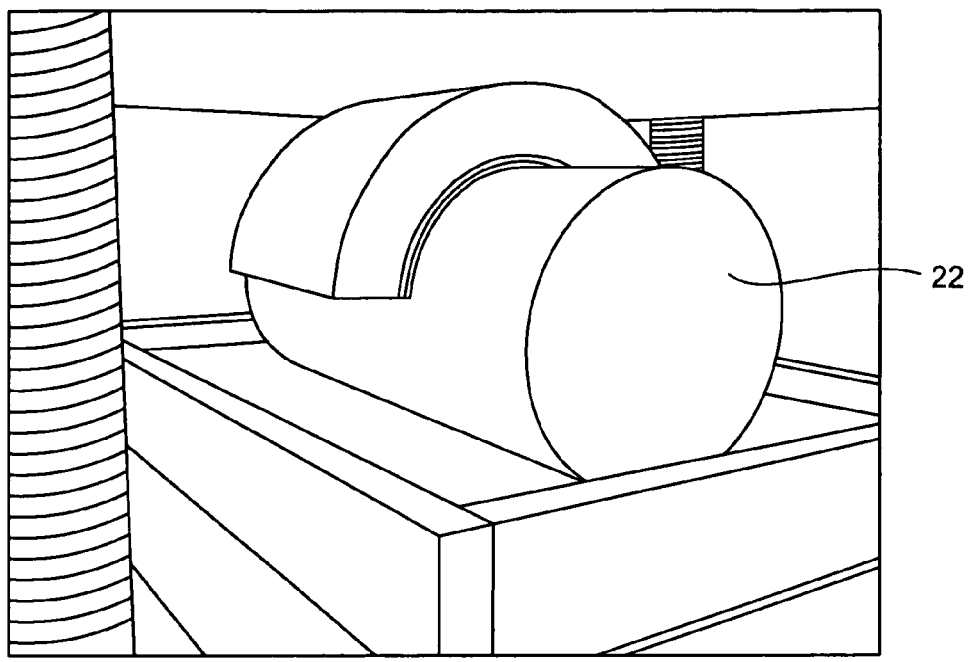
FIG. 5 is an illustration for a mold for the half cylinder configuration of FIG. 4.

In another process, a shrink wrap is used to maintain the plies in the desired arrangement, which is particularly suitable for parts having a rotational symmetry, such as cylinders or half cylinders 20. See FIG. 4. The plies are laid up on a mold 22, such as a cylinder. See FIG. 5. A thin piece of sheet metal such as tin can be placed over the part to give the finished part a smooth surface finish and prevent the formation of surface creases from the shrink wrap. A piece of perforated PTFE material is then taped over the plies to prevent the shrink wrap from sticking to the part. The cylindrical mold is clamped to a composite winding machine to tightly wrap the shrink wrap over the plies. The winding machine is spun slowly as the shrink wrap is pulled in tension to tightly wrap the part with, for example, two layers of shrink wrap. The edges of the wrap are taped tightly with flashing tape. The wrapped part is placed in an oven at a low temperature, such as 250° F. for 2.5 hours. The part is then taken out of the oven and the shrink wrap removed, because the shrink wrap would not survive higher temperatures. The unwrapped part, which is now able to retain its shape, is placed back in the oven at a suitable temperature for a suitable time to fully cure the part.

The precursor composite material can be formed by a pultrusion process. In pultrusion, plies of woven and/or unidirectional fabric are fed through a wet-out bath of the carbon precursor material to saturate the fibers. The excess precursor material is squeezed off to meter the amount of precursor material. The fabric plies are fed through forming cards as necessary and then into a pultrusion die. The precursor material is cured in the die, and the composite precursor material exits the die. Pultrusion is a cost effective process for forming unlimited lengths of material. The material can be cut into desired sizes. In typical prior art pultrusion processes, it is desirable to use thicker plies to limit the amount of material and provide for easier processing.

The thinness of such thin ply carbon fiber fabric makes the fabric difficult to handle. Additionally, the wider the weave or ribbon width of the fabric, the more difficult it is to handle. The material has a tendency to slip and shift so that the fiber orientation becomes skewed. A number of steps or techniques can be used to limit the slippage and to create viable thin ply composite product. For example, the fabric may be pre-impregnated with a suitable low melt binder, such as 2-3 wt. % polyamide, to stabilize the fabric to allow for better handling and durability during lay-up. Alternatively or additionally, stitches may be placed through the fabric to help to hold the fabric in place.

Further, special steps generally must be taken in the lay-up process. In one technique, each ply is staged by wetting out both surfaces of the ply with the carbon precursor and heating in an oven, for example, at 180° F. for 40-60 minutes. Staging the plies in this way drives off most of the water and alcohol in the precursor, rendering the plies drier and easier to manipulate during the lay-up process. Staged material with a phenolic/CNT mix is easier to handle and has more stiffness than staged material with just phenolic resin or mesophase pitch. Carbon black particulates mixed with the precursor material also make the fabric easier to handle.

In another lay-up technique, flashing tape can be used to tape off edges of the fabric as it is cut to size. The flashing tape holds the fabric in place throughout the lay-up. The flashing tape must be cut off prior to curing, however, which results in some waste of fabric. Also, the fabric is typically provided by the vendor on a waxed paper layer. The fabric can be left on the waxed paper during cutting. After cutting and taping, a piece of fabric is gently removed from the waxed paper and laid on top of a thin layer of resin on a plate or in a mold. The waxed paper can be placed on top of the fabric and the fabric pressed down to smooth it out and to ensure that it has adhered to the resin. The waxed paper is removed and another thin layer of resin is gently spread across the fabric to wet out the upper surface of the fabric. The next layer of fabric is placed on top, ensuring that the taped edges are aligned. Again, the waxed paper is placed on top of the fabric and pressed down to smooth out the fabric and to ensure that it has adhered to the resin. The waxed paper is removed and another thin layer of resin is gently spread across the fabric to wet out the fabric. These steps are repeated for the desired number of plies. An aluminum press plate is placed on top of the plies and used as a guide to cut off the tape and excess fabric.

A peel ply fabric can be placed on the top and bottom of the stack of plies to improve the surface finish and make the surface more resin rich. The peel ply fabric can be, for example, a fiberglass fabric coated with a release agent, as would be known in the art.

In another alternative, pultrusion can be used to streamline the staging/prepregging of continuous rolls of woven carbon fabric thin ply material and its assembly into laminate form. The thin plies must be handled more carefully, such as by carefully adjusting the tension on the plies, to prevent warping or other damage.

Figure 6:
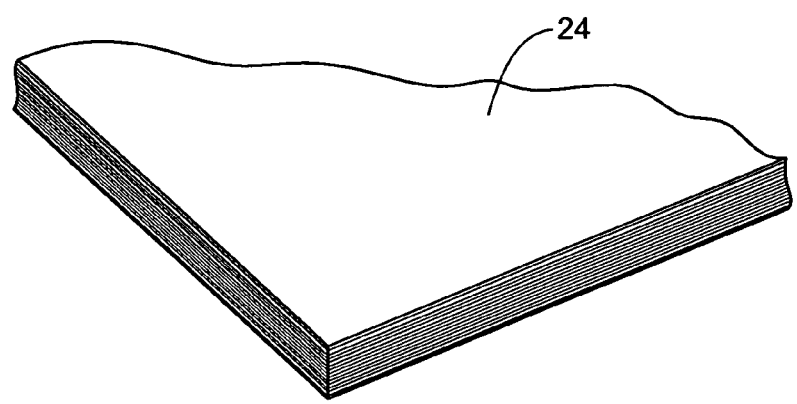
FIG. 6 is a reinforced carbon composite material formed using thin ply carbon fiber fabric.

After the preform is cured, the precursor composite material undergoes a carbonization process to convert the precursor matrix material to carbon through a thermal degradation process. After the carbonization process, the carbonized (or charred) composite material is subjected to a densification process, in which densification cycles are repeated until a desired density is reached. Suitable densification processes include liquid impregnation (low or high pressure) or chemical vapor infiltration (CVI) techniques or both, as would be known in the art. This newly introduced matrix must also now be carbonized (liquid impregnant) or heat treated and machined to remove sealed off porosity (CVI). These processes must be repeated many times until a desired bulk density is achieved (having known performance characteristics) indicating that the composite porosity is minimal. The cumulative time involved for the repeated cycles of densification can range from weeks to months. A graphitization step is performed by heating the material to high temperatures to form graphite. A silicon carbide protective layer can be formed on the outer surfaces of the RCC composite material if desired. Typical densities of the precursor composite material prior to the carbonization process are 0.0506 to 0.0578 lb/in$^3$. During carbonization, the material typically loses some density as the additive burns away and leaves voids. Typical target densities after the densification process are 0.0578 to 0.0650 lb/in$^3$, a greater density being preferred. The desired range for the volume fraction of fiber in the final composite material 24 (FIG. 6) is generally 50-70%.

It will be appreciated that the composite material can be formed from layers of thin ply unidirectional tape rather than thin ply woven fabric, and for convenience the term fabric as used herein includes such use of unidirectional tape. The composite material can be formed from a combination of woven fabric and unidirectional tape. Additionally, it will be appreciated that the thin ply composite material can be combined with conventional thicker ply material when, for instance, the increased impact resistance achievable with the thin ply composite material is desirable.

The invention is not to be limited by what has been particularly shown and described, except as indicated by the appended claims.

What is claimed is:

1. A reinforced carbon-carbon composite material, comprising:
    a plurality of plies of a thin ply carbon fiber fabric arranged in layers, each ply comprising ribbons woven together, each ribbon having a width of at least approximately 15 mm, a crimp angle between crossing fibers of each ply less than 9°, and each ply having a thickness no greater than 0.006 inch;
    a matrix of carbon material infiltrating pores of the carbon fiber fabric; and
    a plurality of carbon nanotubes dispersed within the matrix.

2. The composite material of claim 1, wherein the plies of the thin ply carbon fiber fabric are arranged in a 0°/90° orientation alternating with a ±45° orientation.

3. The composite material of claim 2, wherein every other ply of the 0°/90° orientation is flipped over, and every other ply of the ±45° orientation is flipped over.

4. The composite material of claim 1, wherein the matrix material is comprised of a carbonized carbon precursor.

5. The composite material of claim 4, wherein the carbon precursor comprises phenolic resin.

6. The composite material of claim 4, wherein the carbon precursor comprises mesophase pitch.

7. The composite material of claim 4, wherein the carbon precursor comprises an epoxy resin.

8. A reinforced carbon-carbon composite material, comprising:
    a plurality of plies of a thin ply carbon fiber fabric arranged in layers, each ply comprising ribbons woven together, each ribbon having a width of at least approximately 15 mm, a crimp angle between crossing fibers of each ply less than 9°, and each ply having a thickness no greater than 0.006 inch;
    plies of a unidirectional tape arranged in layers adjacent at least a portion of the plies of the woven ribbons, each ply of the tape having a thickness less than 0.0025 inch; and
    a matrix of carbon material infiltrating pores of the carbon fiber fabric and the tape.

9. A reinforced carbon-carbon composite material, comprising:
    a plurality of plies of a thin ply carbon fiber fabric arranged in layers, each ply comprising a unidirectional tape having a thickness no greater than 0.0025 inch or a fabric of woven ribbons having a thickness no greater than 0.006 inch, and a crimp angle between crossing fibers of each ply less than 9°; and
    a matrix of carbon material infiltrating pores of the carbon fiber fabric; and
    a plurality of carbon nanotubes dispersed within the matrix.

10. The composite material of claim 9, wherein the matrix material is comprised of a carbonized carbon precursor.

11. The composite material of claim 10, wherein the carbon precursor comprises phenolic resin.

12. The composite material of claim 10, wherein the carbon precursor comprises mesophase pitch.

13. The composite material of claim 10, wherein the carbon precursor comprises an epoxy resin.

14. The composite material of claim 8, wherein the matrix material is comprised of a carbonized carbon precursor.

15. The composite material of claim 14, wherein the carbon precursor comprises phenolic resin.

16. The composite material of claim 14, wherein the carbon precursor comprises mesophase pitch.

17. The composite material of claim 14, wherein the carbon precursor comprises an epoxy resin.

* * * * *

UNITED STATES PATENT AND TRADEMARK OFFICE
CERTIFICATE OF CORRECTION

PATENT NO. : 7,407,901 B2
APPLICATION NO. : 11/331437
DATED : August 5, 2008
INVENTOR(S) : Pavel Bystricky et al.

Page 1 of 1

It is certified that error appears in the above-identified patent and that said Letters Patent is hereby corrected as shown below:

Column 2, line 6, "(CNTS)" should read --(CNTs)--; and

Column 3, line 14, "angles a" should read --angles α--.

Signed and Sealed this

Thirty-first Day of March, 2009

JOHN DOLL
*Acting Director of the United States Patent and Trademark Office*